United States Patent
Rusta-Sallehy et al.

(10) Patent No.: US 7,117,106 B2
(45) Date of Patent: Oct. 3, 2006

(54) SYSTEM AND METHOD FOR ALARM RECOVERY FOR AN ELECTROLYZER CELL MODULE

(75) Inventors: Ali Rusta-Sallehy, Richmond Hill (CA); Michael Vale, Brampton (CA)

(73) Assignee: Hydrogenics Corporation, Mississauga (CA)

( * ) Notice: Subject to any disclaimer, the term of this patent is extended or adjusted under 35 U.S.C. 154(b) by 0 days.

(21) Appl. No.: 10/944,879

(22) Filed: Sep. 21, 2004
(Under 37 CFR 1.47)

(65) Prior Publication Data

US 2005/0209800 A1    Sep. 22, 2005

Related U.S. Application Data

(63) Continuation-in-part of application No. 10/825,137, filed on Apr. 16, 2004.

(60) Provisional application No. 60/504,218, filed on Sep. 22, 2003.

(51) Int. Cl.
*G01R 31/00* (2006.01)

(52) U.S. Cl. .................. 702/63; 204/228.3; 204/228.4; 204/228.6; 600/345; 600/372; 600/549

(58) Field of Classification Search .................. 702/63; 204/228.3, 228.4, 228.6; 600/345, 372, 549
See application file for complete search history.

(56) References Cited

U.S. PATENT DOCUMENTS

| | | | | |
|---|---|---|---|---|
| 4,836,903 A * | 6/1989 | Cawlfield | ................ | 204/228.3 |
| 4,857,158 A * | 8/1989 | Cawlfield | ................ | 204/228.3 |
| 5,425,361 A * | 6/1995 | Fenzlein et al. | ............ | 600/345 |
| 5,991,707 A * | 11/1999 | Searles et al. | .............. | 702/185 |
| 6,361,678 B1 * | 3/2002 | Childs et al. | ................ | 205/335 |

* cited by examiner

*Primary Examiner*—Carol S. W. Tsai
(74) *Attorney, Agent, or Firm*—Bereskin & Parr

(57) ABSTRACT

Some embodiments of the present invention provide a system and method suited for controlling the operation of an electrolyzer cell module. Specifically, some embodiments of the present invention provide a system and method that incorporates a call to an alarm recovery sequence into a safety system suited for use with an electrolyzer cell module, which is able to suspend the normal operations and initiate an alarm recovery sequence upon detecting that a corresponding alarm threshold has been violated. The safety system and method is then able to restart the normal operations if it is determined that the alarm recovery sequence was successful, meaning that the process and operating parameters that violated the particular alarm threshold have been brought back to within a safe operating range.

18 Claims, 10 Drawing Sheets

SYSTEM AND METHOD FOR ALARM RECOVERY FOR AN ELECTROLYZER CELL MODULE

PRIORITY CLAIM

This application is a continuation-in-part of U.S. application Ser. No. 10/825,137 (filed on Apr. 16, 2004), and the entire contents of which is hereby incorporated by reference. Furthermore, this application also claims the benefit, under 35 USC 119(e), of U.S. Provisional Application No. 60/504,218 that was filed on Sep. 22, 2003, and the entire contents of which is hereby incorporated by reference.

FIELD OF THE INVENTION

The invention relates to electrolyzer cells and, in particular to systems and methods suited for controlling an electrolyzer cell module.

BACKGROUND OF THE INVENTION

An electrolyzer cell is a type of electrochemical device that uses energy to dissociate a compound liquid into its components. For example, water can be dissociated into hydrogen and oxygen (e.g. $H_2O \rightarrow H_2 + O_2$).

In practice, a number of electrolyzer cells are arranged into a stack to produce sizable amounts of one or more of the components of a compound liquid. To this end, the electrolyzer cell stack is included in a module that includes a suitable combination of supporting elements, collectively termed a balance-of-plant system, which is specifically configured to maintain operating parameters and functions for the electrolyzer cell stack.

The normal operation of an electrolyzer cell module may be stopped due to violated alarm thresholds built into a control system that co-ordinates the operation of the balance-of-plant system. Such stoppages, if premature, can severely limit the utility of electrolyzers and/or other systems designed to co-operate with them.

SUMMARY OF THE INVENTION

According to aspects of an embodiment of the invention there is provided an electrolyzer cell module having: a safety system for monitoring at least one process and operating parameter related to the operation of the electrolyzer cell module and evaluating whether or not at least one alarm threshold has been violated by the at least one process and operating parameter; and, a computer usable medium, in communication with the safety system, having computer program readable code means embodied therein for causing the safety system to suspend the normal operation of the electrolyzer cell module when the at least one alarm threshold has been violated and subsequently to initiate a corresponding alarm recovery sequence for a violated alarm threshold, the computer program readable code means comprising: instructions for recording and evaluating measured process and operating parameters in order to determine whether or not the at least one alarm threshold has been violated.

In some embodiments, an electrolyzer cell module also includes a number of sensors, and the computer program readable code means also includes: instructions for polling the sensors to measure the at least one process and operating parameter; and instructions for evaluating whether or not any one of the alarm thresholds has been violated.

In some embodiments, the computer program readable code means also includes: instructions for suspending the normal operation of the electrolyzer cell module when any one of the alarm thresholds has been violated; and instructions for initiating the corresponding alarm recovery sequence for the violated alarm threshold.

In some embodiments, the computer program readable code means also includes: instructions for suspending the normal operation of the electrolyzer cell module after at least one alarm flag with a respective priority is generated; and, instructions for initiating a corresponding alarm recovery sequence for the alarm flag. In some related embodiments, the computer program readable code means also includes: instructions for suspending one of the normal operation of the electrolyzer cell module and an executing alarm recovery sequence if at least one other alarm flag, with a higher priority than the alarm flag corresponding: to the executing alarm recovery sequence, is generated; and, instructions for initiating the corresponding alarm recovery sequence for the at least one other alarm flag.

In some embodiments the computer program readable code means also includes: instructions for generating an alarm interrupt with a respective priority for each alarm threshold that is violated. In some related embodiments the computer program readable code means also includes: instructions for suspending the normal operation of the electrolyzer cell module after at least one alarm interrupt with a respective priority is generated; and instructions for initiating a corresponding alarm recovery sequence for the alarm interrupt. Sometimes the computer program readable code means also includes: instructions for suspending one of the normal operation of the electrolyzer cell module and an executing alarm recovery sequence if at least one other alarm interrupt, with a higher priority than the alarm interrupt corresponding to the currently executing alarm recovery sequence, is generated; and instructions for initiating the corresponding alarm recovery sequence for the at least one other alarm interrupt.

In some embodiments the computer program readable code means also includes: instructions for determining whether or not an executing alarm recovery sequence was effective; and, if the alarm recovery sequence is determined to have been not effective, the computer usable medium having computer program readable code means embodied therein for causing the safety system to initiate an emergency shutdown of the electrolyzer cell module; alternatively, if the alarm recovery sequence is determined to have been effective, the computer usable medium having computer program readable code means embodied therein for causing the safety system to restart the normal operation of the electrolyzer cell module.

In some embodiments, the computer program readable code means also includes: instructions for allowing an executing alarm recovery sequence to be interrupted and suspended if an alarm threshold having a higher priority is violated; and instructions for initiating another alarm recovery sequence corresponding to the violated alarm threshold with the higher priority. In some related embodiments, the computer program readable code means also includes: instructions for determining whether or not an executing alarm recovery sequence was effective; and if the alarm recovery sequence is determined to have been not effective, the computer usable medium having computer program readable code means embodied therein for causing the safety system to initiate an emergency shutdown of the electrolyzer cell module; alternatively, if the alarm recovery sequence is determined to have been effective, the computer usable medium having computer program readable code means embodied therein for causing the safety system to restart one of the normal operation of the electrolyzer cell module and the suspended alarm recovery sequence.

According to other aspects of another embodiment of the invention there is provided a method of controlling an electrolyzer cell module including: measuring at least one process and operating parameter of the electrolyzer cell module; evaluating the at least one process and operating parameter to determine whether or not the at least one alarm threshold has been violated by the at least one process and operating parameter; suspending the normal operation of the electrolyzer cell module if at least one alarm threshold has been violated; and, initiating an alarm recovery sequence.

In some embodiments, the method also includes: determining whether or not the alarm recovery sequence was effective; and, if the alarm recovery sequence was not effective, terminating the normal operation of the electrolyzer cell module; alternatively, if the alarm recovery sequence was effective, restarting the normal operation of the electrolyzer cell module.

In some embodiments the method also includes generating an alarm flag with a respective priority for each violated alarm threshold, which may be processed in order of priority.

In some embodiments, the method includes: suspending an executing alarm recovery sequence if another alarm threshold having a higher priority is violated; and, initiating another alarm recovery sequence corresponding to the other violated alarm threshold. In some related embodiments the method also includes: determining whether or not the other alarm recovery sequence was effective; and, if the other alarm recovery sequence was not effective, terminating the operation of the electrolyzer cell module; alternatively, if the another alarm recovery sequence was effective, restarting one of the normal operation of the electrolyzer cell module and the suspended alarm recovery sequence.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings that illustrate aspects of embodiments of the present invention and in which.

DETAILED DESCRIPTION OF THE INVENTION

Shutting down an electrolyzer cell module during normal operation may, in some instances, be unnecessary and corrective action may be possible to bring the process and operating parameters, which violated a particular alarm threshold, back to within a safe operating range. In some embodiments of the invention there is provided a modified safety system that can interrupt and suspend the operation of an electrolyzer cell module when an alarm threshold has been violated and initiate a corresponding alarm recovery sequence to bring the electrolyzer cell module back to within a safe operating range. In some embodiments, if the modified safety system determines that the alarm recovery sequence was not effective, emergency shutdown of the electrolyzer cell module is initiated. In other embodiments, further alarm recovery sequences may be initiated before an emergency shutdown is commenced. Various examples are provided below to demonstrate how aspects of embodiments of the invention may be employed in different control system architectures suited for use with electrochemical cell modules.

There are a number of different electrochemical cell technologies and, in general, this invention is expected to be applicable to all types of electrochemical cells. Very specific example embodiments of the invention have been developed for use with Proton Exchange Membrane (PEM) electrolyzer cells. Various other types of electrolyzer cells also include, without limitation, Solid Polymer Water Electrolyzers (SPWE). Similarly, various types of fuel cells include, without limitation, Alkaline Fuel Cells (AFC), Direct Methanol Fuel Cells (DMFC), Molten Carbonate Fuel Cells (MCFC), Phosphoric Acid Fuel Cells (PAFC), Solid Oxide Fuel Cells (SOFC) and Regenerative Fuel Cells (RFC).

Figure 1:
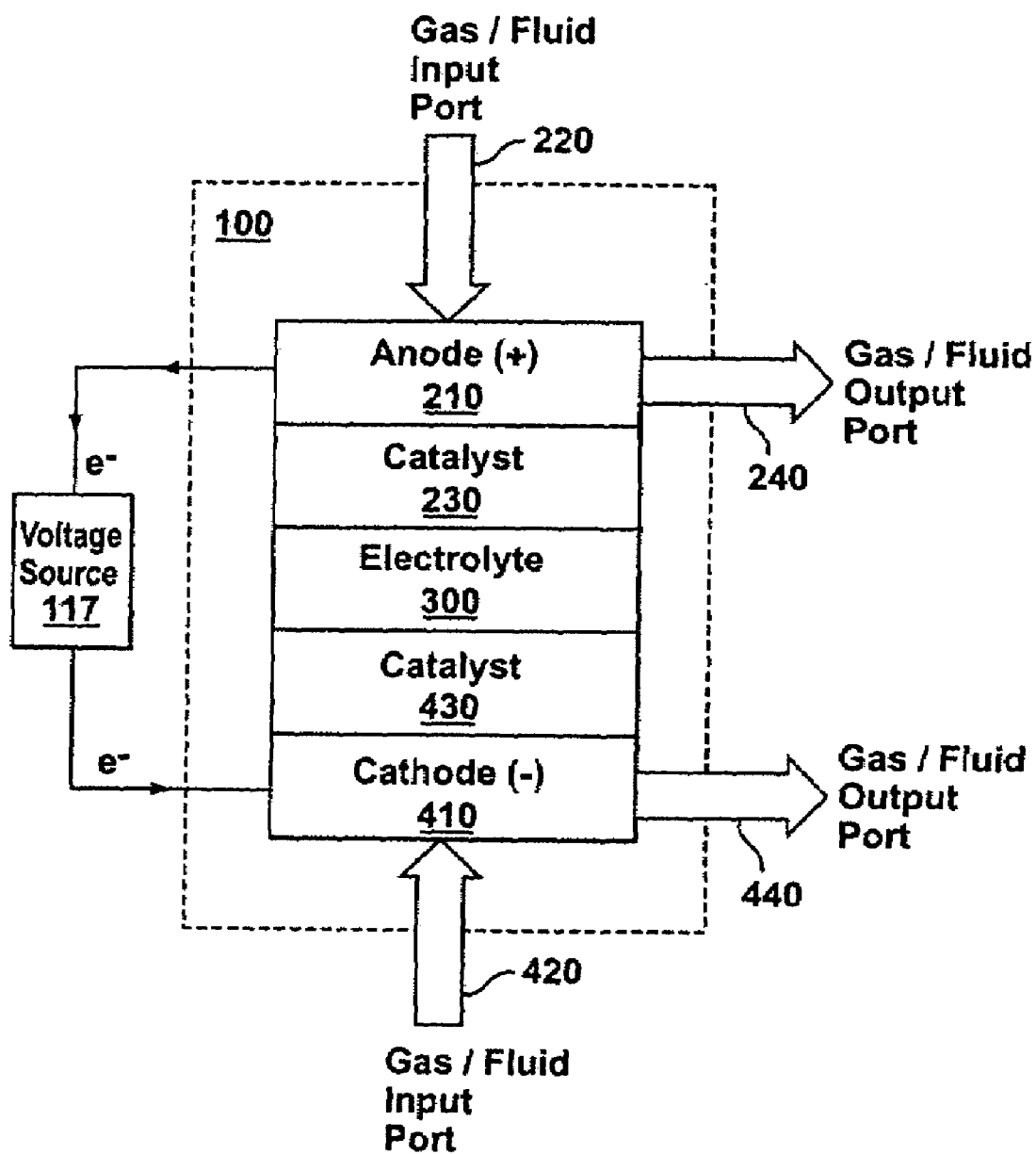
FIG. 1 is a simplified schematic drawing of an electrolyzer cell.

Referring to FIG. 1, shown is a simplified schematic diagram of a Proton Exchange Membrane (PEM) electrolyzer cell, simply referred to as electrolyzer cell 100 hereinafter, that is described herein to illustrate some general considerations relating to the operation of electrochemical cells. It is to be understood that the present invention is applicable to various configurations of electrochemical cell modules that each include one or more electrochemical cells.

The electrolyzer cell 100 includes an anode electrode 210 and a cathode electrode 410. The anode electrode 210 includes a water input port 220 and a water/oxygen output port 240. Similarly, the cathode electrode 410 includes a water input port 420 and a water/hydrogen output port 440. An electrolyte membrane 300 is arranged between the anode electrode 210 and the cathode electrode 410.

The electrolyzer cell 100 also includes a first catalyst layer 230 arranged between the anode electrode 210 and the electrolyte membrane 300, and a second catalyst layer 430 arranged between the cathode electrode 410 and the electrolyte membrane 300.

In order to energize the electrolyzer cell 100, a voltage source 117 is coupled between the anode and cathode electrodes 210, 410.

In operation, water is introduced into the anode electrode 210 via the water input port 220. The water is dissociated electrochemically according to reaction (1), given below, in the presence of the electrolyte membrane 300 and the first catalyst layer 230.

$$H_2O \rightarrow 2H^+ + 2e^- + 1/2 O_2 \qquad (1)$$

The chemical products of reaction (1) are hydrogen ions (i.e. cations), electrons and oxygen. The hydrogen ions pass through the electrolyte membrane 300 to the cathode electrode 410 while the electrons are drawn through the voltage source 117. Water containing dissolved oxygen molecules is drawn out through the water/oxygen output port 240.

Simultaneously, additional water is introduced into the cathode electrode 410 via the water input port 420 in order to provide moisture to the cathode side of the membrane 300.

The hydrogen ions (i.e. protons) are electrochemically reduced to hydrogen molecules according to reaction (2), given below, in the presence of the electrolyte membrane 300 and the second catalyst layer 430. That is, the electrons and the ionized hydrogen atoms, produced by reaction (1) in the anode electrode 210, are electrochemically consumed in reaction (2) in the cathode electrode 410.

$$2H_2^+ + 2e^- \rightarrow H_2 \qquad (2)$$

The water containing dissolved hydrogen molecules is drawn out through the water/hydrogen output port 440. The electrochemical reactions (1) and (2) are complementary to one another and show that for each oxygen molecule ($O_2$) that is electrochemically produced two hydrogen molecules ($H_2$) are electrochemically produced.

Although only one electrolyzer cell is illustrated in FIG. 1, it is commonly understood that in practice a number of electrochemical cells, all of one type, can be arranged in stacks having common elements, such as process gas/fluid feeds, drainage, electrical connections and regulation devices. That is, an electrochemical cell module is typically made up of a number of singular electrochemical cells connected in series to form an electrochemical cell stack. The electrochemical cell module also includes a suitable combination of structural elements, mechanical systems, hardware, firmware and software that is employed to support the function and operation of the electrochemical cell stack. Such items include, without limitation, piping, sensors, regulators, current collectors, seals, insulators, actuators, switches and electromechanical controllers.

Figure 2:
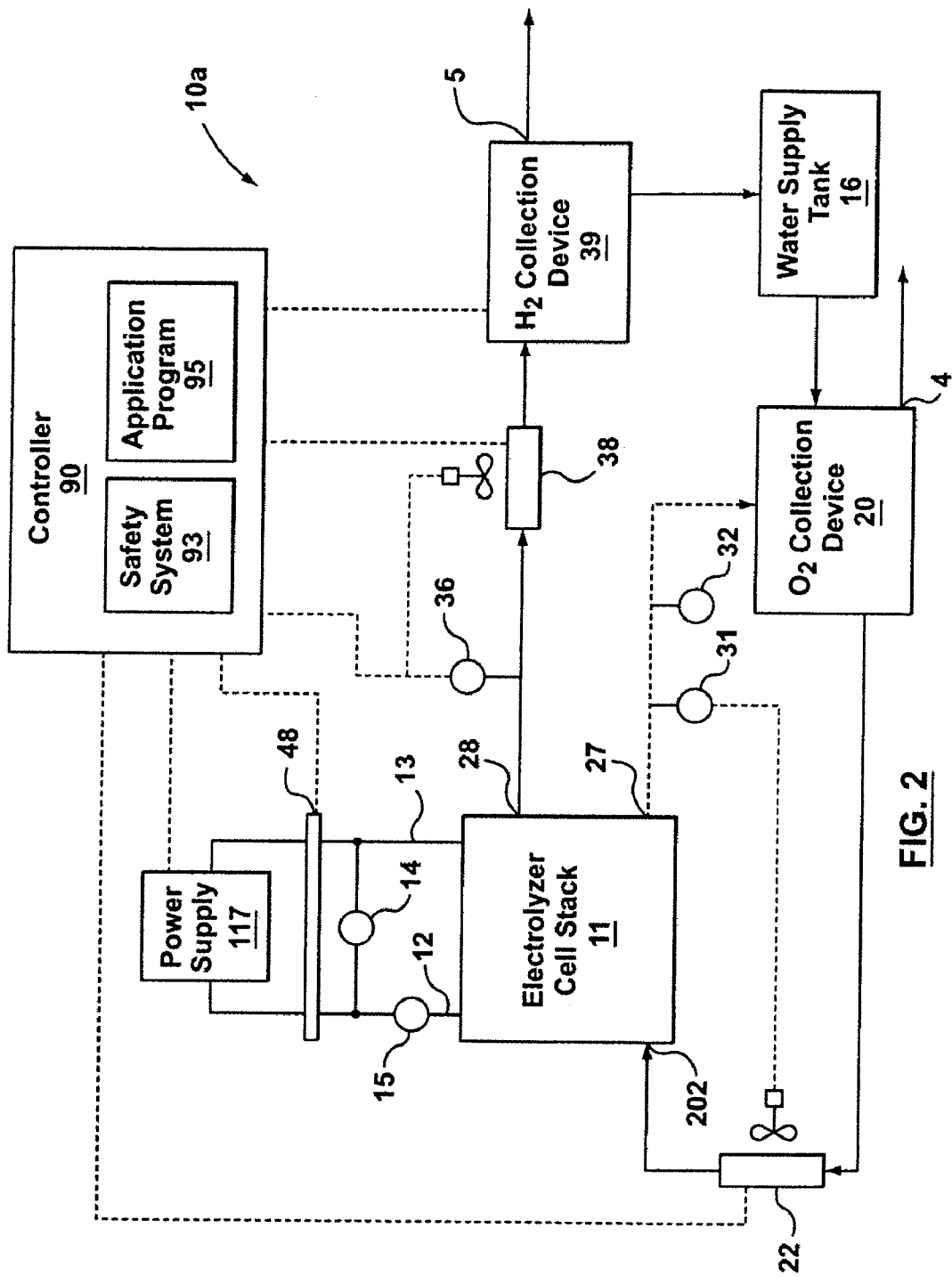
FIG. 2 is a simplified schematic drawing of an electrolyzer cell module according to aspects of an embodiment of the invention.

Referring now to FIG. 2, illustrated is a simplified schematic diagram illustrating an electrolyzer cell module 10a that is configured to dissociate water ($H_2O$) into hydrogen ($H_2$) and oxygen ($O_2$). The electrolyzer cell module 10a includes an electrolyzer cell stack 11, a power supply 117, a hydrogen collection device 39, an oxygen collection device 20, a water supply tank 16 and a suitable combination of balance-of-plant elements.

Those skilled in the art will appreciate that shown in FIG. 2 are only those balance-of-plant elements necessary to describe aspects of this example embodiment of the invention. Generally, balance-of-plant elements can be roughly divided into two groups. A first group may be defined as a suitable combination of supporting apparatus and electromechanical systems that includes, without limitation, elements such as heaters, filters, pumps, humidifiers, valves and the like. A second group may be defined as a suitable combination of control and sensor systems that includes, without limitation, sensors, switches, valves, hardware, software, firmware and the like.

In some embodiments, the control and sensor systems include a centralized control system including for example a microcontroller and/or a computer program readable code means for monitoring and regulating the operation of an electrolyzer cell module, including portions of the supporting apparatus and electromechanical systems. In alternative embodiments, distributed control systems/controllers are provided along with or in place of a centralized control system. Generally, the sensors and the switches are electronically coupled to the aforementioned centralized and/or distributed control systems, which process sensor readings and signal the switches and other electromechanical devices accordingly in order to regulate and in some cases shut down an electrolyzer cell module.

With specific reference to FIG. 2, the electrolyzer cell module 10a includes a controller 90 that is used to manage the operations of the electrolyzer cell module 10a. Although the controller 90 is specifically shown to be connected to a number of elements included in the electrolyzer cell module 10a of FIG. 2, those skilled in the art will appreciate that a controller can be connected to any suitable combination of elements included in an electrolyzer cell module. Moreover, as also shown in FIG. 2, the controller 90 includes a modified safety system 93 and at least one application program 95 used to manage the normal operations of the electrolyzer cell module 10a. Specifically, in the present embodiment of the invention the controller 90 includes memory storing a computer program readable code means having instructions for the modified safety system 93 and the at least one application program 95.

The modified safety system 93, in accordance with an embodiment of the invention, is capable of calling an alarm recovery sequence in the event that a corresponding alarm threshold has been violated. Different example embodiments of the modified safety system 93 will be described below with reference to FIGS. 6, 7 and 8. In particular, as described in detail below, the modified safety system 93 and the application program 95 can either be separated and independent from each other or integrated together into one operating program.

The electrolyzer cell stack 11 includes one or more PEM electrolyzer cells (not shown). Each PEM electrolyzer cell includes an electrolyte membrane arranged between an anode electrode and a cathode electrode as schematically illustrated in FIG. 1. The electrolyzer cell stack 11 has a cathode outlet port 28, an anode inlet port 202 and an anode outlet port 27. The cathode outlet port 28 is fluidly connected to each of the respective cathode electrodes included in the electrolyzer cell stack 11. Similarly, the anode inlet and outlet ports 202, 27 are fluidly connected to each of the respective anode electrodes included in the electrolyzer cell stack 11. The electrolyzer cell stack 11 also includes respective electrical connections 12, 13 to the anode and cathode terminals of the electrolyzer cell stack 11.

The power supply 117 is coupled across the electrical connections 12, 13 of the electrolyzer cell stack 11. In some embodiments, the power supply 117 is, without limitation, one of a voltage source and a current source.

A stack disconnect device 48 is coupled between the electrolyzer cell stack 11 and the power supply 117. Additionally, a current 15 and a voltage sensor 14 are appropriately arranged between the stack disconnect device 48 and the power supply 117 to measure the current drawn by the electrolyzer cell stack 11 and the voltage across the electrical connections 12, 13.

The stack disconnect device 48 is operable between two states. In a first state, the stack disconnect device 48 electrically couples the power supply 117 to the electrolyzer cell stack 11. In a second state, the stack disconnect device 48 electrically isolates the power supply from the electrolyzer cell stack 11. In some embodiments, switching the stack disconnect device 48 between the two states is, for example, controlled by a central and/or local distributed control system, which may use readings from the current and voltage sensors 15, 14.

The hydrogen collection device 39 includes an output port 5; another output port and an input port. In some embodiments, the output port 5 serves as a tap for hydrogen collected by the hydrogen collection device 39, and is also connectable to other downstream components (not shown). The input of the hydrogen collection device 39 is coupled to the cathode outlet port 28 to accept a combination of water and hydrogen from the electrolyzer cell stack 11. The other output port is coupled to the water supply tank 16 to return water separated from hydrogen during operation.

A first temperature sensor 36 and a first heat exchanger 38 are arranged along the fluid pathway from the cathode outlet port 28 to the hydrogen collection device 39. The first temperature sensor 36 is coupled to provide the first heat exchanger 38 with a regulation signal. Using the regulation signal from the first temperature sensor 36, the first heat exchanger 38 is operable to cool the stream of hydrogen and water exiting the cathode outlet port 28, thereby initiating condensation of the water to separate it from the hydrogen within the hydrogen collection device 39.

The oxygen collection device 20 includes an output port 4; another output port and two input ports. In some embodiments, the output port 4 serves as a tap for oxygen collected by the oxygen collection device 20, and is also connectable to other downstream components (not shown). The other output port is coupled to provide water to the anode inlet port 202, and one of the input ports is coupled to receive a combination of water and oxygen from the anode outlet port 27. The other input port is coupled to receive water from the water supply tank 16. That is, according to this specific example, water is provided to the electrolyzer cell stack 11 from the water supply tank 16 via the oxygen collection device 20, which also recycles water received back from the electrolyzer cell stack 11.

A second temperature sensor 31 and a temperature safety switch 32 are arranged along the fluid pathway from the anode outlet port 27 to the oxygen collection device 20. The first temperature safety switch 32 is operable to send an alarm signal to a centralized and/or distributed control system if the temperature of the stream of oxygen and water exiting the anode outlet port 27 reaches a predetermined high value. In some embodiments, the first temperature safety switch 32 is configured to override and halt the operation of the electrolyzer cell module 10a in the event that the temperature is too high, which may imply that there is a severe problem with the electrolyzer cell module 10a.

A second heat exchanger 22 is arranged along the fluid pathway to the anode inlet port 202 from the oxygen collection device 20. The second heat exchanger 22 is also coupled to receive a regulation signal from the second temperature sensor 31 arranged on the fluid pathway originating from the anode outlet port 27. Using the regulation signal from the second temperature sensor 31, the second heat exchanger 22 is operable to adjust the temperature of the water stream entering the electrolyzer cell stack 11.

Optionally, in other embodiments, the water supply tank 16 is also coupled to a cathode inlet port of the electrolyzer cell stack 11 to hydrate the respective cathode sides of the membranes included in the electrolyzer cell stack In some embodiments, the hydrogen and oxygen collection devices 39, 20 each include a condenser, such as, for example, the apparatus described in the applicant's issued U.S. Pat. No. 6,619,054, which is hereby incorporated by reference.

In some embodiments, the hydrogen collection device 39 has a volume that is about twice the volume of the oxygen collection device 20. This difference in size accommodates the relative rates of hydrogen and oxygen evolution that will occur according to reactions (1) and (2) described above.

In different embodiments the first and second heat exchangers 38, 22 are made up of different components. For example, in one embodiment the first and second heat exchangers 38, 22 include fans for temperature regulation by air-cooling, whereas in other embodiments the first and second heat exchangers 38, 22 include pumps and coolant fluids for temperature regulation by liquid-cooling. Those skilled in the art will generally appreciate that a heat exchanger can be embodied in a number of different forms, but in each embodiment the function of a heat exchanger is to serve as a temperature regulation means.

The operation of the electrolyzer cell stack 11 (in FIG. 2) is similar to that of the electrolyzer cell module 100 (in FIG. 1). To briefly reiterate, the power supply 117 supplies the requisite energy for reactions (1) and (2). Oxygen is produced in the anode electrodes according to reaction (1) and then a combination of water and oxygen flows out of the anode outlet port 27 into the oxygen collection device 20 where the oxygen is separated from the water. Hydrogen is produced in the cathode electrodes according to reaction (2) and then a combination of water and hydrogen flows out of the cathode outlet port 28 into the hydrogen collection device 39 where the hydrogen is separated from the water.

The operation of the first and second temperature sensors 36, 31, the first and second heat exchangers 38, 22 and the temperature safety switch 32 are described below with respect to the flow charts provided in FIGS. 6, 7 and 8. In some embodiments a control system is provided with a computer program readable code means that has instructions that mirror the method step described below. Moreover, those skilled in the art will appreciate that these methods may be modified without departing from the scope of the inventive aspects specifically described herein.

Figure 3:
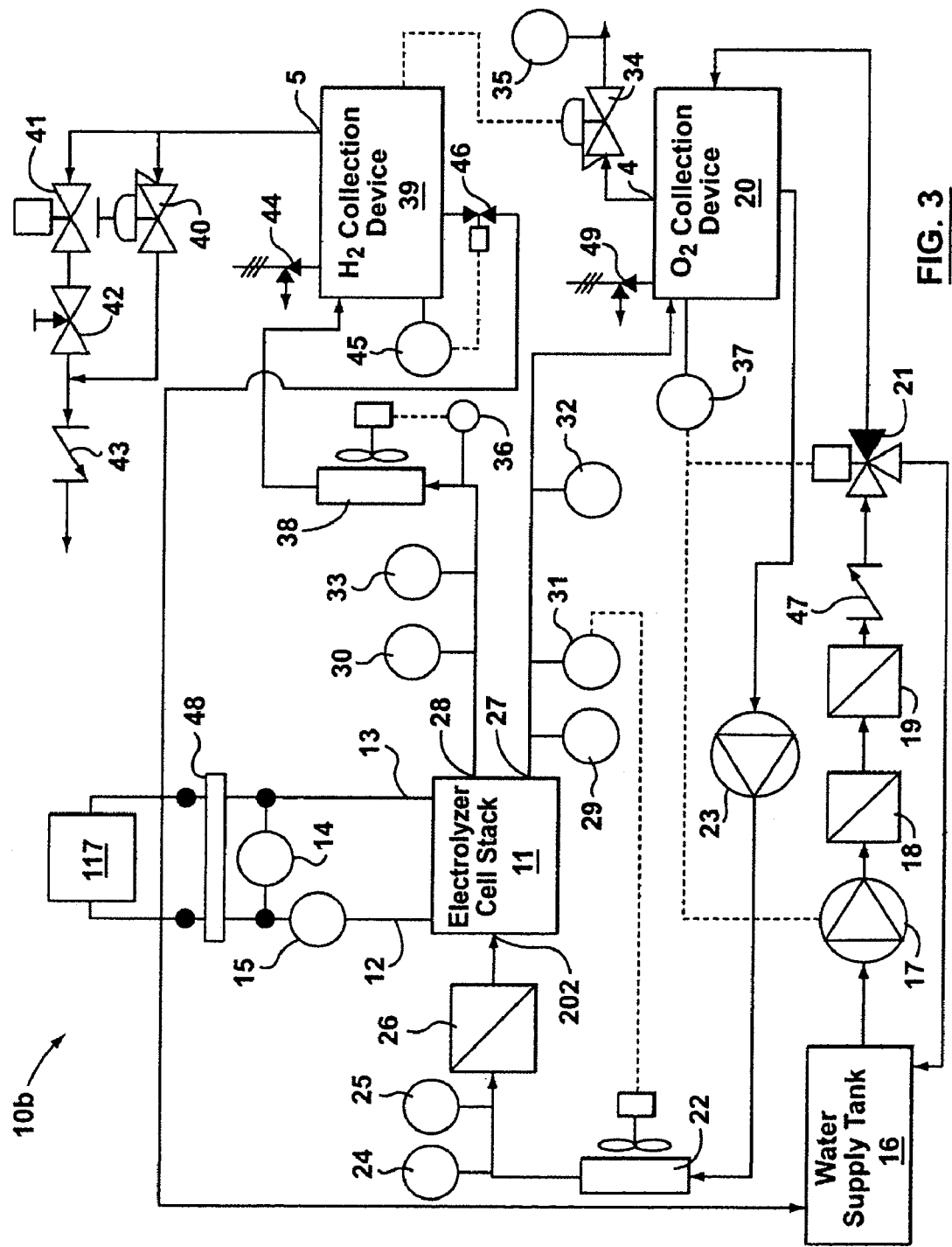
FIG. 3 is a first detailed schematic drawing of an electrolyzer cell module according to aspects of an embodiment of the invention.

Referring now to FIG. 3, illustrated is a first detailed schematic drawing of an electrolyzer cell module 10b according to aspects of an embodiment of the invention. The electrolyzer cell module 10b (shown in FIG. 3) is configured to dissociate water ($H_2O$) into hydrogen ($H_2$) and oxygen ($O_2$), and includes the same elements as the simplified electrolyzer cell module 10a (shown in FIG. 2). In particular, the electrolyzer cell module 10b includes the electrolyzer cell stack 11 with the various aforementioned inlet and outlet ports 202, 27, 28 and the respective electrical connections 12, 13 to the anode and cathode terminals of the electrolyzer cell stack 11. The electrolyzer cell module 10b also includes the power supply 117, the water supply tank 16, the hydrogen collection device 39, the oxygen collection device 20 and a pressure following device 34. However, these elements are not connected to one another exactly as described above. Instead, an additional number of balance-of-plant elements are connected between each of the aforementioned elements. Those skilled in the art will appreciate that the electrolyzer cell module 10*b* also includes a controller (not shown) similar to the controller 90 illustrated in FIG. 2, which is connected to a suitable combination of elements; however, this controller has not been illustrated for the sake of simplicity.

Again, the power supply 117 is coupled to the electrical connections 12, 13 of the electrolyzer cell stack 11 to energize the electrolyzer cell stack 11. A stack disconnect device 48 is also coupled between the electrical connections 12, 13 of the electrolyzer cell stack 11 and the power supply 117. Additionally, a current 15 and a voltage sensor 14 are appropriately arranged between the stack disconnect device 48 and the power supply 117 to measure the current drawn by the electrolyzer cell stack 11 and the voltage across the electrical connections 12, 13.

The stack disconnect device 48 is operable between two states. In a first state, the stack disconnect device 48 electrically couples the power supply 117 to the electrolyzer cell stack 11. In a second state, the stack disconnect device 48 electrically isolates the power supply from the electrolyzer cell stack 11. In some embodiments, switching the stack disconnect device 48 between the two states is, for example, controlled by a central and/or local distributed control system, which may use readings from the current and voltage sensors 15, 14.

The anode and cathode outlet ports 27, 28 of the electrolyzer cell stack 11 are respectively connected to the oxygen and hydrogen collection devices 20, 39 through respective combinations of balance-of-plant elements.

Specifically, in this example embodiment, there is a second pressure sensor 30, a first pressure safety switch 33, a first temperature sensor 36 and a first heat exchanger 38 arranged along the fluid pathway from the cathode outlet port 28 to the hydrogen collection device 39. The first pressure safety switch 33 is operable to send an alarm signal to a central and/or distributed control system if the pressure of the stream of hydrogen and water exiting the cathode outlet port 28 reaches a predetermined high value. In some embodiments, the first pressure safety switch 33 is configured to override and halt the operation of the electrolyzer cell module 10*a* in the event that the pressure is too high, which may imply that there is a severe problem with the electrolyzer cell module 10*a*.

The first temperature sensor 36 is coupled to provide the first heat exchanger 38 with a regulation signal. Using the regulation signal from the first temperature sensor 36, the first heat exchanger 38 is operable to cool the stream of hydrogen and water exiting the cathode outlet port 28, thereby initiating condensation of the water to separate it from the hydrogen within the hydrogen collection device 39.

Similarly, in this example embodiment, there is a first pressure sensor 29, a second temperature sensor 31 and a first temperature safety switch 32 arranged along the fluid pathway from the anode outlet port 27 to the oxygen collection device 20. The first temperature safety switch 32 is operable to send an alarm signal to a centralized and/or distributed control system if the temperature of the stream of oxygen and water exiting the anode outlet port 27 reaches a predetermined high value. In some embodiments, the first temperature safety switch 32 is configured to override and halt the operation of the electrolyzer cell module 10*a* in the event that the temperature is too high, which may imply that there is a severe problem with the electrolyzer cell module 10*a*.

The anode inlet port 202 of the electrolyzer cell stack 11 is connected to receive water from the oxygen collection device 20 through a respective combination of balance-of-plant elements as well. Specifically, a circulation pump 23, a second heat exchanger 22, a resistivity meter 24, a flow switch 25 and preferably a de-ionizing filter 26 are arranged along the fluid pathway to the anode inlet port 202 from the oxygen collection device 20. The second heat exchanger 22 is also coupled to receive a regulation signal from the second temperature sensor 31 arranged on the fluid pathway originating from the anode outlet port 27.

The circulation pump 23 is operable to force the flow of water into the electrolyzer cell stack 11. In some embodiments, the circulation pump is of a high-temperature/high-pressure type, and is constructed with materials such as Teflon® or Peek®. Using the regulation signal from the second temperature sensor 31, the second heat exchanger 22 is operable to adjust the temperature of the water stream entering the electrolyzer cell stack 11. The resistivity meter 24 is operable to measure the resistivity of the water flowing into the electrolyzer cell stack 11. The flow switch 25 is operable to send an alarm signal to a central and/or local distributed control system if the water level is too low. In some embodiments, the de-ionizing filter 26 incorporates organic and particulate filtering functions.

There are also a number of balance-of-plant elements arranged along the fluid pathway from the water supply tank 16 to the oxygen collection device 20. Specifically, the water supply tank 16 is connected to the oxygen collection device 20 through a fill pump 17, an organic filter 18, a particulate and a de-ionizing filter 19, a check valve 47 and a three-way valve 21. An output of the three-way valve 21 is also coupled back to the water supply tank 16. The check valve 47 is arranged to prevent back flow of water through the fill pump 17 and filters 18, 19.

A first water level indicator 37 is coupled to the oxygen collection device 20 and to the fill pump 17 and the three-way valve 21. The first water level indicator 37 is operable to measure the water level in the oxygen collection device 20 and provide a feedback control signal to the fill pump 17 and the three-way valve 21. For example, when the water level in the oxygen collection device is higher than a pre-set high level value, the three-way 21 valve is set to re-circulate water back to the water supply tank 16; or, when the water level is lower than a pre-set low level value, the fill pump 17 is signalled to increase the rate of water flow.

Comparatively, the balance-of-plant setup between the hydrogen collection device 39 and the water supply tank 16 is quite simple. A second water level indicator 45 is coupled to the hydrogen collection device 39 and a purge valve 46 is connected between the hydrogen collection device 39 and the water supply tank 16. The purge valve 46 is operated by a control signal received from the second water level indicator 45 coupled to the hydrogen collection device 39. When the water level in the hydrogen collection device 39 is higher than a pre-set level value, the purge valve 46 opens after receiving the control signal from the second water level indicator 45. Once the purge valve 46 is opened, water can flow from the hydrogen collection device 39 to the water supply tank 16. Alternatively, the purged water can be dumped out of the system or used for other purposes (i.e. as a coolant).

The hydrogen collection device 39 also has a safety valve 44 that automatically vents gas from the hydrogen collection device 39 when the pressure inside reaches a pre-set upper threshold. Accordingly, the safety valve 44 aids in the regulation of the hydrogen pressure, which in this embodiment, is followed by the oxygen pressure via the operation of the pressure following device 34.

In this particular embodiment, the output port 5 of the hydrogen collection device 39 is coupled to a combination of valves. Specifically, the output port 5 is coupled to a backpressure valve 40 that is in parallel with a normally open venting valve 41 that is arranged in series with a needle/orifice valve 42. The outputs of the backpressure valve 40 and the needle/orifice valve 42 are coupled in parallel into a check valve 43.

The backpressure valve 40 is arranged to regulate the hydrogen pressure within the hydrogen collection device 39 during the operation of the electrolyzer cell module 10b. The hydrogen is preferably stored in a large low-pressure (e.g. around 100 psi) tank having water drainage to remove whatever small amount of water that could still be present with the hydrogen. Alternatively, the hydrogen could be stored in low-pressure storage devices such as metal hydrides. The hydrogen could also be further compressed into higher-pressure storage vessels.

The normally open venting valve 41 is preferably closed during start-up and opens when the electrolyzer cell module 10b shuts down. The normally open valve 41 also functions as an emergency pressure relief path when the electrolyzer cell module 10b is suddenly stopped in emergency situations, which reduces the chances that any of the pumps in the electrolyzer cell modules 23 will be de-primed by the sudden formation of gas bubbles in the system.

The needle/orifice valve 42 is arranged after the normally open valve 41 to slowly lower the hydrogen pressure to the ambient pressure, after the electrolyzer cell module 10b is shut down, again, in order not to de-prime any of the circulation pumps. This is described in greater detail in the applicant's co-pending U.S. patent application Ser. No. 10/944,868 which was filed on the same day as this application, and is hereby incorporated by reference.

The check valve 43 is arranged to prevent back flow into the hydrogen collection device 39 and isolate the hydrogen pressure from pressures downstream.

A hydrogen gas sensor 35 is arranged on the output port 4 of the oxygen collection device 20 to detect irregularly high levels of hydrogen in the oxygen stream, which may indicate that there is a leak somewhere in the system. The oxygen collection device 20 also has a safety valve 49 arranged to vent out oxygen should the pressure inside reach a pre-set high value.

With continued reference to FIG. 3, the pressure following device 34 is arranged between the output port 4 of the oxygen collection device 20 and the hydrogen collection device 39. Specifically, the pressure following device 34 includes a pressure sensor connected to measure the hydrogen pressure in the hydrogen collection device 39, and a dome-loaded pressure valve, which is configured as a negative bias pressure regulator, that is connected to the output port 4 of the oxygen collection device 20. The pressure following device 34 measures/senses the hydrogen pressure and sets the oxygen pressure via control of the dome-loaded pressure valve. Aspects of pressure following arrangements according to aspects of embodiments of the invention are described in greater detail in the applicant's co-pending U.S. patent application Ser. No. 10/945,492, which was filed on the same day as this application and is hereby incorporated by reference.

In this particular embodiment, the hydrogen side of the electrolyzer cell stack 11 does not include a pump, and, accordingly the hydrogen pressure is primarily established using the backpressure valve 40. It is beneficial to the overall system efficiency to keep the hydrogen pressure relatively high in order to reduce the size of hydrogen gas bubbles, which will in turn increase the active reaction area and reduce the amount of current fed to the electrolyzer cell stack 11. Having smaller hydrogen bubbles improves efficiency and counteracts any decrease in efficiency caused by the relatively high pressure(s) of the system.

Figure 4:
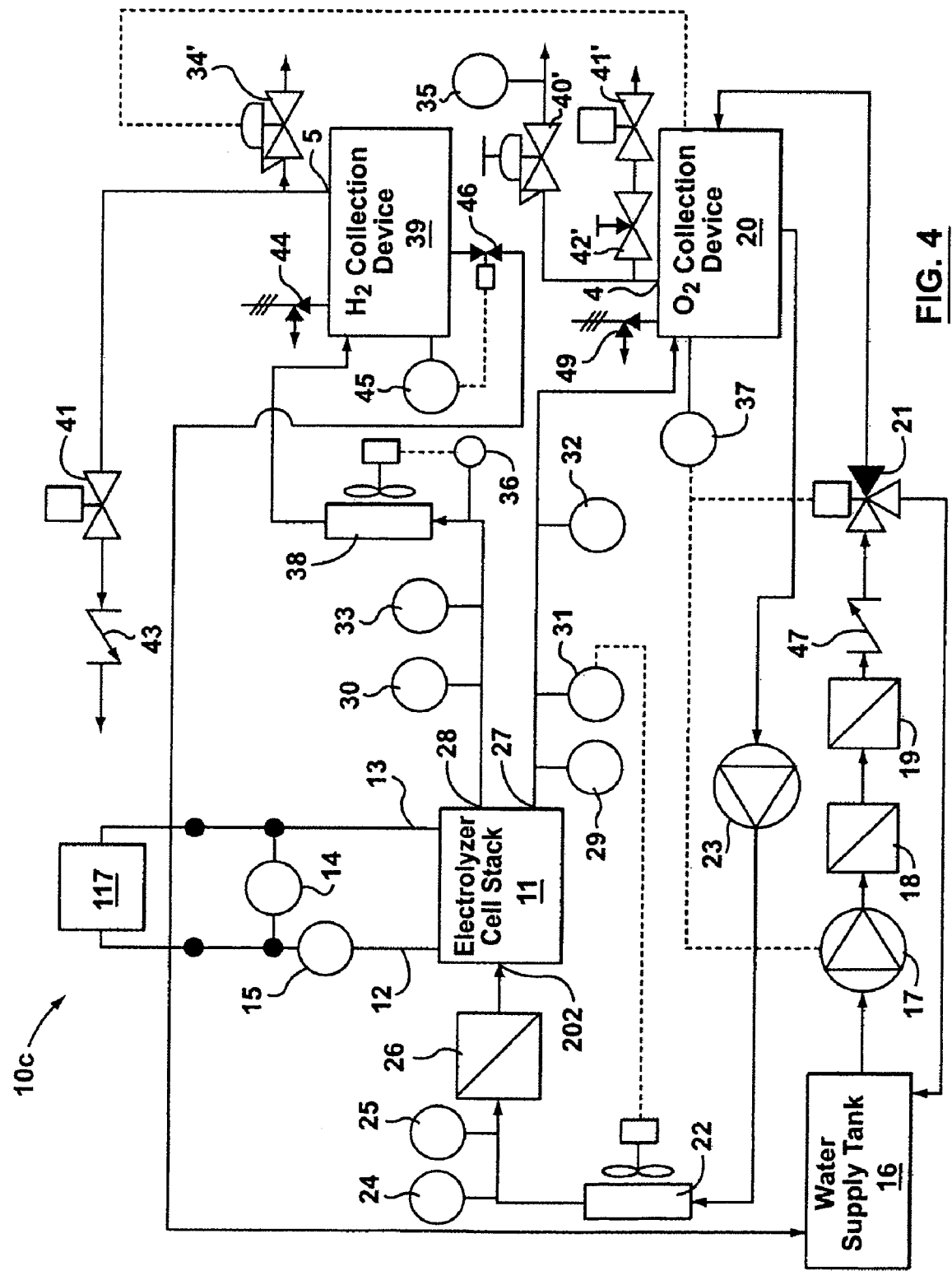
FIG. 4 is a second detailed schematic drawing of an electrolyzer cell module according to aspects of an alternative embodiment of the invention.

Referring now to FIG. 4, shown is an electrolyzer cell module 10c, which includes an alternative pressure following arrangement to that included in the electrolyzer cell module 10b shown in FIG. 3. Specifically, the electrolyzer cell module 10c is configured so that the hydrogen pressure follows the oxygen pressure, but remains higher. To this end, a pressure following device 34' is arranged between the output port 5 of the hydrogen collection device 39 and the oxygen collection device 20. The pressure following device 34' includes a pressure sensor connected to measure the oxygen pressure in the oxygen collection device 20, and a dome-loaded pressure valve, which is configured as a positive bias pressure regulator, that is connected to the output port 5 of the hydrogen collection device 39. As described above, the pressure following device 34' measures/senses the oxygen pressure and sets the hydrogen pressure via control of the dome-loaded pressure valve. Again, aspects of pressure following arrangements according to aspects of embodiments of the invention are described in greater detail in the applicant's co-pending U.S. patent application Ser. No. 10/945,492 which was filed on the same day as this application and is hereby incorporated by reference. Additionally, those skilled in the art will appreciate that the electrolyzer cell module 10c also includes a controller (not shown) similar to the controller 90 illustrated in FIG. 2, which is connected to a suitable combination of elements; however, this controller has not been illustrated for the sake of simplicity.

Moreover, the output port 5 of the hydrogen collection device 39 is now only connected to the normally open venting valve 41 that is arranged in series with the check valve 43. The normally open venting valve 41 and the check valve 43 operate as described above. Additionally, the output port 4 of the oxygen collection device 20 is connected to a needle/orifice valve 42' that is further connected in series to another normally open valve 41'. The needle/orifice valve 42' and the normally open valve 41' operate to regulate the oxygen pressure during the operation of the electrolyzer cell module 10c.

Figure 5:
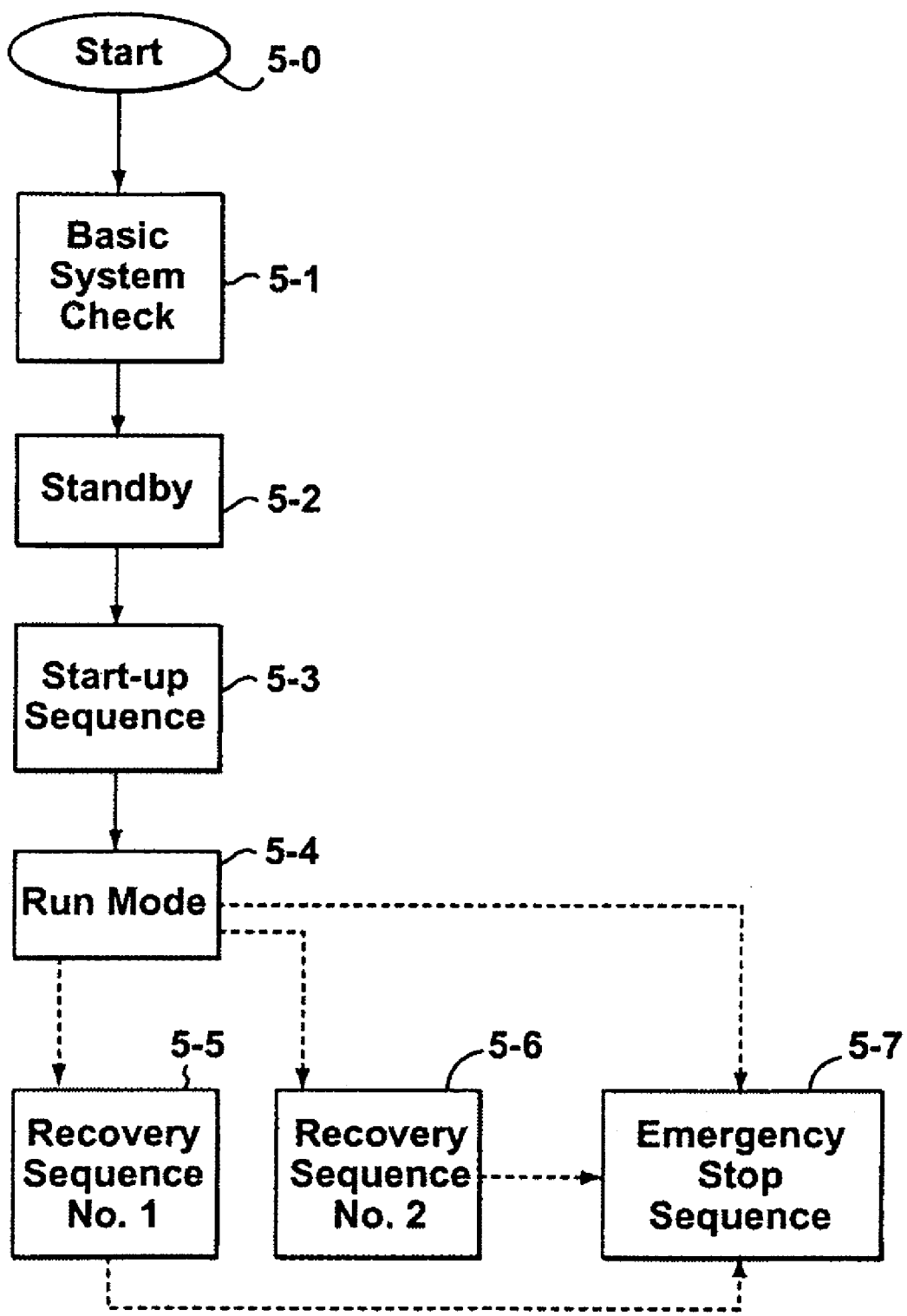
FIG. 5 is a flow chart illustrating a high-level method of operating an electrolyzer cell module according to aspects of an embodiment of the invention.

FIG. 5 is a flow chart illustrating a high-level method of operating an electrolyzer cell module according to aspects of an embodiment of the invention. At step 5-0, the electrolyzer cell module is energized and an initialization sequence, including basic checks, occurs at step 5-1. The basic checks include, without limitation, checks for control system readiness, the presence of electric power and pneumatic air pressure.

After the basic system checks are complete, the electrolyzer cell module enters a standby mode in step 5-2. During the standby mode, the control system waits for a start-up command from an operator or another automated machine.

Once a start-up command has been received, a start-up sequence is commenced at step 5-3. During the start-up sequence the electrolyzer cell module is readied for normal operation. Examples of operations that occur during a start-up sequence include, without limitation, a water fill process, priming of pumps, water polishing, pressurization, and hydrogen purging.

After the start-up sequence 5-3, a run mode is started at step 5-4. The run mode can end in at least three different ways, which include, without limitation, normal shutdown initiated by an operator or another automated machine, through an alarm recovery sequence at steps 5-5 and 5-6, and by an emergency stoppage at step 5-7. The alarm recovery sequences and emergency stoppages result from safety system logic that is included in the control system for an electrolyzer cell module. Examples describing how the safety system logic can be incorporated into the control system for an electrolyzer cell module are described below with reference to FIGS. 6, 7 and 8. Additionally, examples of alarm recovery sequences are described below with reference to FIGS. 9 and 10.

In some embodiments a control system is provided with a computer program readable code means that has instructions that mirror the method steps described below. Moreover, those skilled in the art will appreciate that these methods may be modified without departing from the scope of the inventive aspects specifically described herein.

Figure 6:
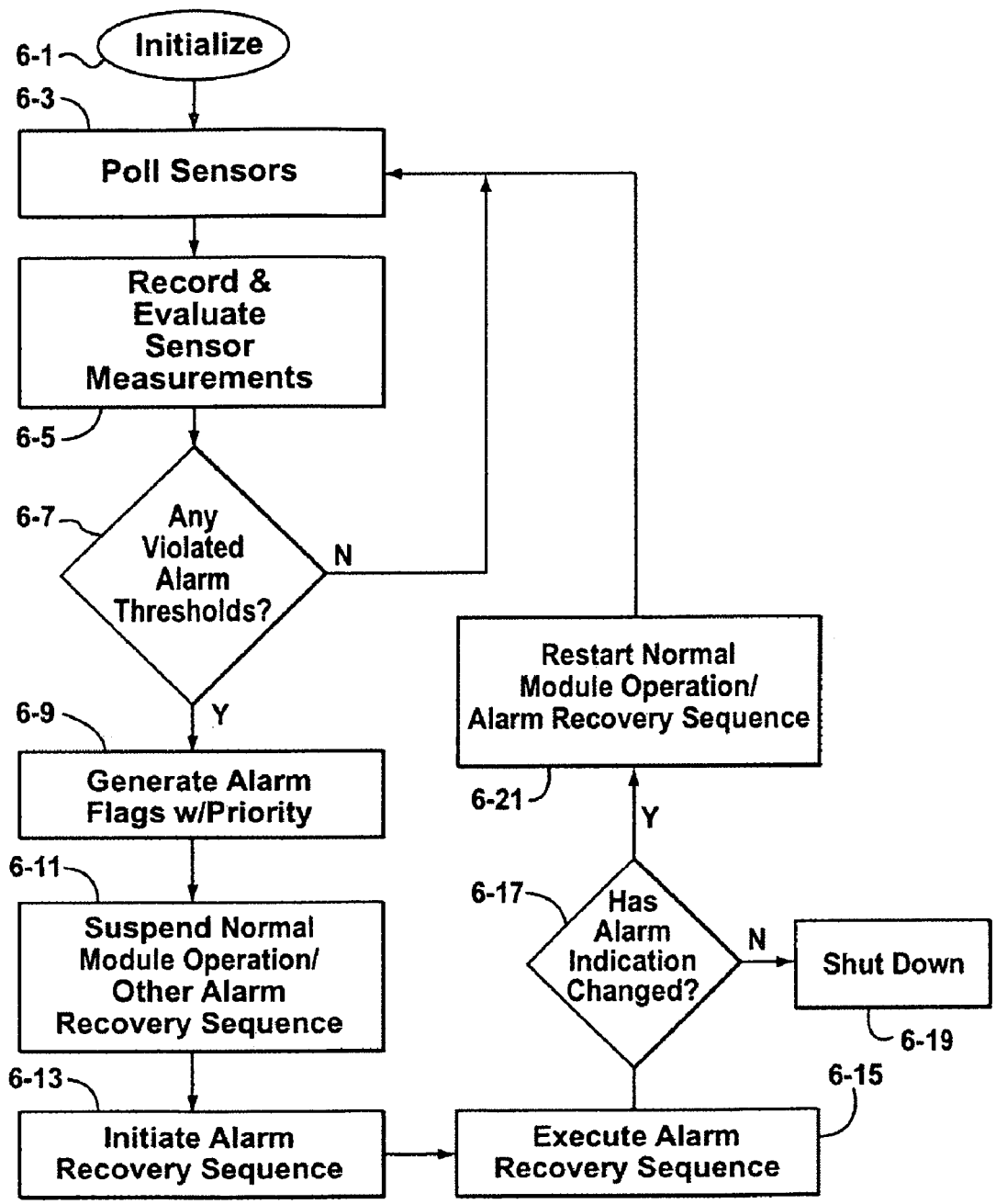
FIG. 6 is a flow chart depicting the general steps provided in a first modified safety program according to an embodiment of the invention.

Referring now to FIG. 6, illustrated is a flow chart depicting the general steps provided in a first modified safety system according to one embodiment of the invention, and hereinafter simply referred to as the safety system. The safety system operates to monitor whether or not any of a number of alarm thresholds is violated during operation of an electrolyzer cell module, and if there is an alarm threshold violation the safety system responds as described below. The alarm thresholds at least partially define a safe operating range for the electrolyzer cell module. The violation of an alarm threshold involves the measurement of one or more process and operating parameters, which are in turn appropriately considered by the safety system.

Starting at step 6-1, the modified safety system is initialized when an electrolyzer cell module is energized as described above with reference to FIG. 5. At such a point sensors and regulators are calibrated and checked. The safety system continuously or intermittently runs during the operation of the electrolyzer cell module. In some embodiments the safety system, described herein with reference to FIG. 6, includes a computer program readable code means having instructions for monitoring, evaluating, interrupting and calling an alarm recovery sequence for a respective violated alarm threshold.

At step 6-3, the safety system polls sensors connected to the electrolyzer cell module thereby measuring process and operating parameters. Any parameter that can be measured that will in turn provide information leading to an indication of how the electrolyzer cell module is operating falls within the scope of parameters that may be measured by the sensors. For example, measurable process and operating parameters may include, but are not limited to, temperatures and pressures of input and output gases, flow rates, and reaction products. Moreover, in some embodiments the safety system includes a computer program readable code means having instructions for polling sensors to measure at least one process and operating parameter.

At step 6-5 the safety system records and evaluates the sensor readings of the measured process and operating parameters. In some embodiments a log is maintained for such records so that such data can be analyzed at a later time. Then, at step 6-7, the safety system determines whether or not any of the measured process and operating parameters has violated any of the alarm thresholds. In some embodiments the safety system includes a computer program readable code means having instructions for recording and evaluating measured process and operating parameters.

If none of the alarm thresholds have been violated (no path, step 6-7), it is assumed that operations are proceeding within the safe operating ranges. Subsequently, the safety system loops back to step 6-3. On the other hand, if one or more of the alarm thresholds have been violated (yes path, step 6-7) the safety system proceeds to step 6-9.

At step 6-9, the safety program suspends an application program associated with the normal operation of the electrolyzer cell module, so that the process and operating parameters that have violated the alarm threshold(s) do not worsen. At step 6-11, the safety system generates an alarm flag for each alarm threshold that has been violated. Each alarm flag is assigned a priority based on its respective importance and/or how severe the damage caused by the alarm threshold violation might be if corrective action is not taken. One skilled in the art would appreciate that the order of steps 6-9 and 6-11 could be interchanged without departing from the scope of the present invention. Further, in some embodiments the safety system includes a computer program readable code means for independently suspending normal operations and/or generating priority-sorted alarm flags for respective alarm thresholds that have been violated.

In other embodiments, the alarm flags are not assigned a priority and each alarm flag is dealt with in order of occurrence.

At step 6-13, the alarm flags are then processed in order of priority. That is, an alarm recovery sequence for the highest priority alarm flag is activated. The alarm recovery sequence is advantageously in the form of a user defined alarm script that is called by the safety system. The alarm script is, in some embodiments, in the form of a computer program readable code means having instructions for carrying out the sequence steps that make up the alarm recovery sequence. Very specific examples of an alarm script are described below with reference to FIGS. 9 and 10.

During step 6-15 the alarm recovery sequence is initiated by the safety system. The safety system continues to poll the sensors and monitor the process and operating parameters. That is, the execution of an alarm recovery sequence is treated the same as the execution of any other application program, which means that a particular alarm recovery sequence corresponding to an alarm flag with a respective priority may be interrupted and suspended if a higher priority alarm is generated by the safety system. This aspect of the invention will be discussed further with reference to the flow chart illustrated in FIG. 7.

After the alarm recovery sequence has finished, the safety system loops back to step 6-3 after restarting the suspended application program (or alarm recovery sequence) from where it was suspended in step 6-21. As described in the applicant's co-pending U.S. application Ser. No. 10/244,609, which is hereby incorporated by reference, the safety system continues to monitor the alarm thresholds, as a part of a separate sub-routine (or sub-system), in order to enact an emergency stoppage, which may still be necessary if the alarm recovery sequence was not effective.

In the present embodiment of the invention, it is assumed that the alarm recovery sequence may have also had a positive effect on some or all of the other alarm flags generated. So instead of processing the lower priority alarm flags found at step 6-7, the safety program loops back to step 6-3 to poll the sensors again to retrieve a current measurement of the process and operating parameters. However, in alternative embodiments the lower priority flags may be processed before returning to step 6-3. Moreover, the execution of an alarm recovery sequence may be interrupted if a higher priority alarm flag is generated.

Figure 7:
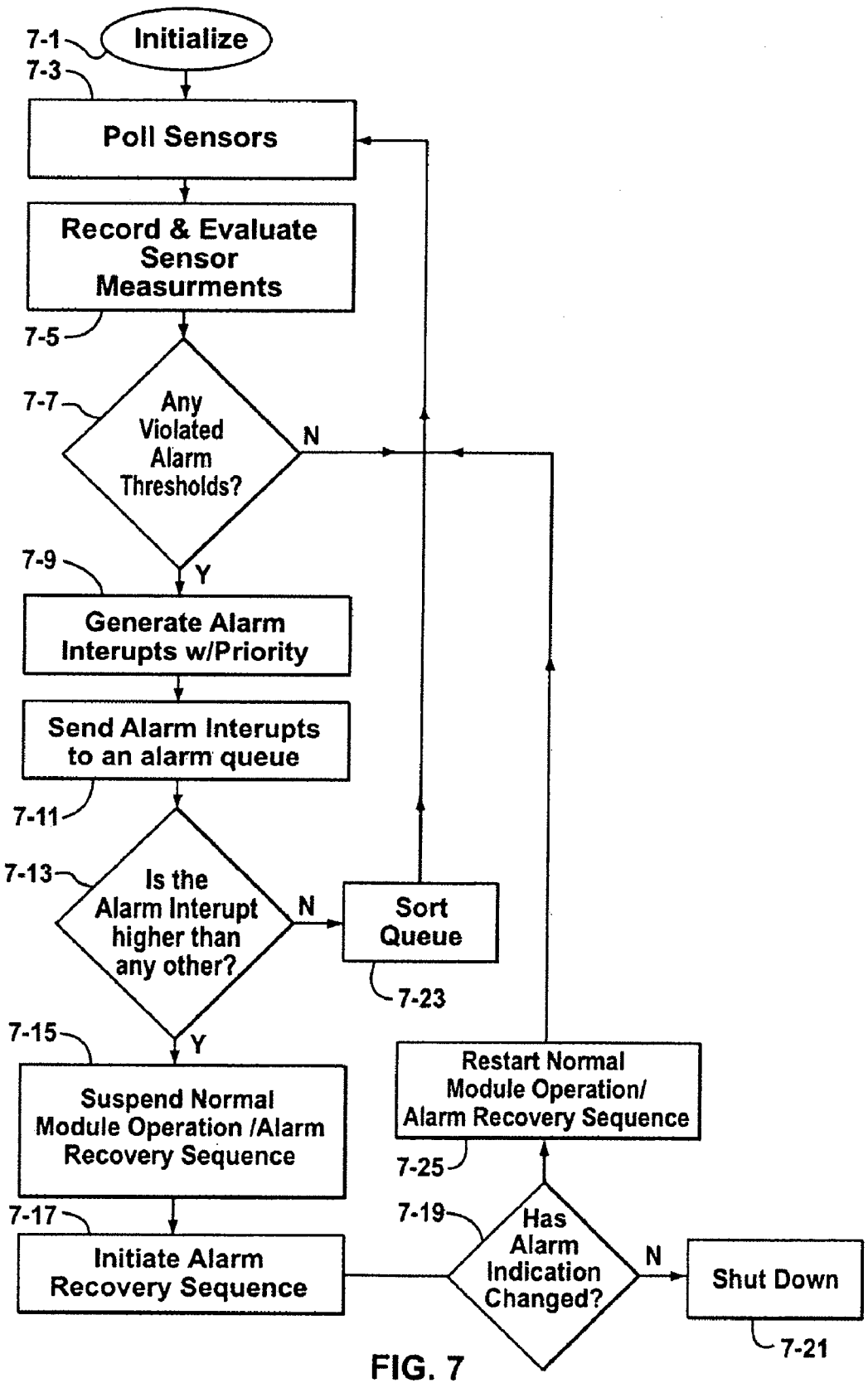
FIG. 7 is a flow chart depicting the general steps provided in a second modified safety program according to another embodiment of the invention.
Figure 8:
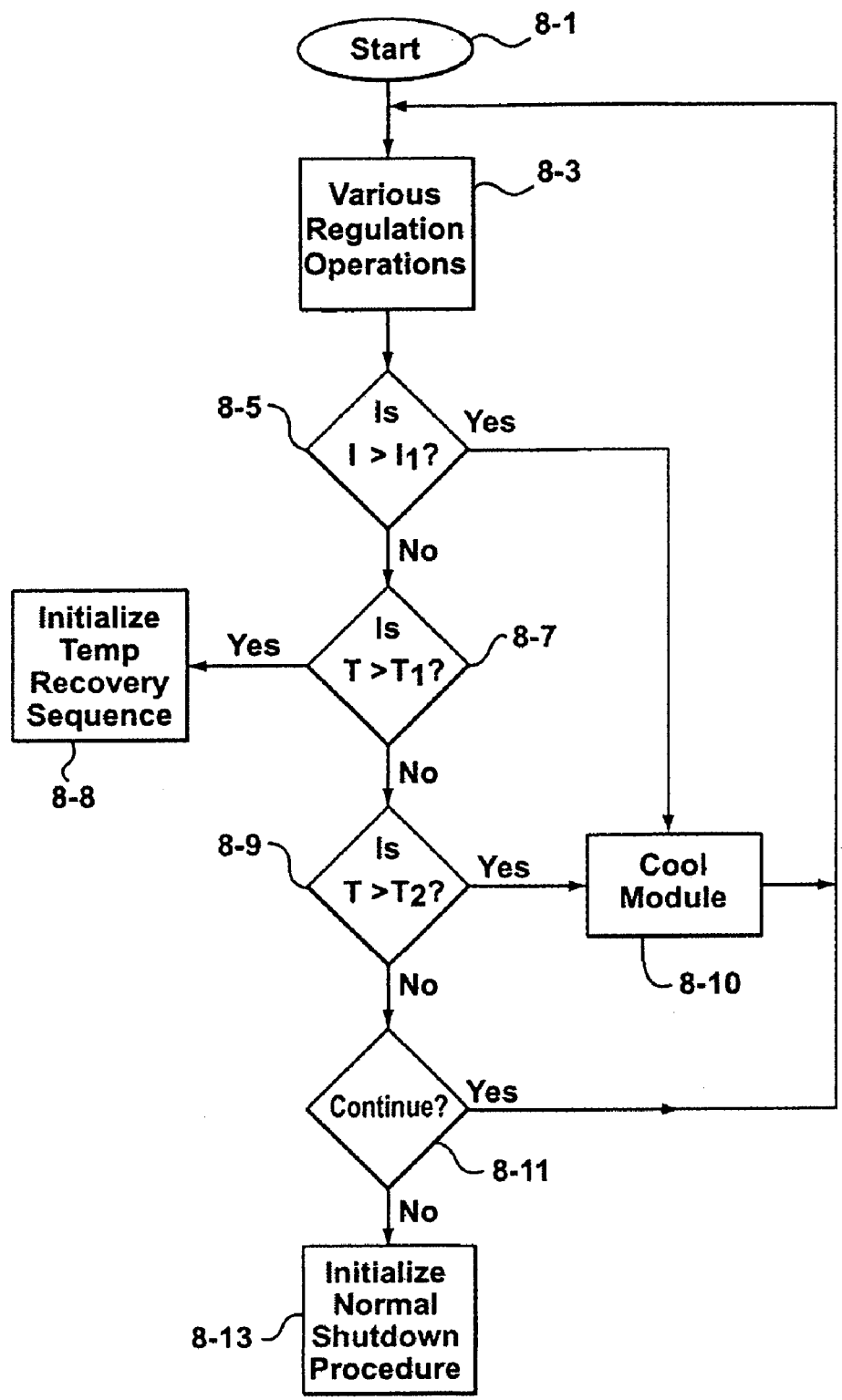
FIG. 8 is a flow chart depicting some of the steps provided in a modified safety system logic that is integrated into a control system for an electrolyzer cell module according to another embodiment of the invention.

Referring now to FIG. 7, illustrated is a flow chart depicting the general steps provided in a second modified safety system according to another embodiment of the invention, and hereinafter simply referred to as the safety system. This safety system has the same practical purpose as the safety system described with reference to FIG. 6. In fact, steps 7-1 to 7-7 are the same as steps 6-1 to 6-7, respectively.

Accordingly, at step 7-9, following from a positive indication at step 7-7 (yes path, step 7-7), the safety system generates at least one alarm interrupt with a respective priority in a similar manner to that which generated the alarm flags in step 7-9. In some embodiments the safety system includes a computer program readable code means having instructions for generating alarm interrupts with respective priorities corresponding to respective alarm thresholds that have been violated.

Subsequently, at step 7-11 the at least one alarm interrupt is sent to an interrupt queue maintained and managed by the safety system. After the at least one alarm interrupt is received into the interrupt queue the safety system, at step 7-13, determines whether or not the at least one alarm interrupt has a priority that is higher than the highest interrupt in the queue. This would include a corresponding alarm interrupt for a respective alarm recovery sequence that is currently being executed. If the at least one alarm interrupt does not (no path, step 7-13) have a higher priority than any other alarm interrupt in the queue, the safety system proceeds to step 7-23, in which the interrupt queue is sorted into an order (i.e. ascending or descending) based on priority. Similar to what was noted above, in alternative embodiments, the alarm interrupts may not be assigned a priority, and in which case, the alarm interrupts would be processed in order of occurrence. The safety program then proceeds back to step 7-3. In some embodiments the safety system includes a computer program readable code means having instructions for maintaining and managing an interrupt queue as described herein. On the other hand, if the at least one alarm interrupt has the highest priority in the interrupt queue (yes path, step 7-13) the safety system proceeds to step 7-15.

At step 7-15 the currently executing application program for the normal operation of the electrolyzer cell module or another alarm recovery sequence is suspended and a respective alarm recovery sequence corresponding to the at least one alarm interrupt is initiated by the safety program. After the respective alarm recovery sequence has finished executing, the safety system determines whether or not the process and operating parameters that resulted in the at least one alarm interrupt have changed to safer values. This process is similar to what was described above with respect to FIG. 6. Subsequently, the safety system proceeds to step 7-3 after restarting the suspended application program (or alarm recovery sequence) from where it was suspended in step 7-25.

Again, as described in the U.S. application Ser. No. 10/244,609, which was incorporated by reference above, the safety system continues to monitor the alarm thresholds, as a part of a separate sub-routine (or sub-system), in order to enact an emergency stoppage, which may be necessary if the alarm recovery sequence was not effective. Moreover, it should again be noted that an alarm recovery sequence is advantageously interruptible by some other alarm recovery sequence that has a respective alarm interrupt with a higher priority than the currently executing alarm recovery sequence. The role of the safety system is to monitor the process and operating parameters and initiate a respective alarm recovery sequence if one of a number of pre-programmed alarm thresholds is crossed during a trial. Emergency shutdown is initiated if an alarm recovery sequence is deemed to have been ineffective.

The safety controls described with reference to FIGS. 6 and 7 are embodied in a separate modified safety program that is capable of interrupting application programs employed for the normal operation of an electrolyzer cell module. However, it is not essential that the safety controls be embodied that way. Referring now to FIG. 8, illustrated is a flow chart depicting some of the steps, as an example, provided in a modified safety system logic that is integrated into a control system for an electrolyzer cell module according to another embodiment of the invention.

The operation of the control system is initiated at step 8-1 and includes operations like basic systems checks as described above with reference to FIG. 5. During the operation of the electrolyzer cell module various regulation operations proceed, as is generally indicated at step 8-3. In this particular embodiment the regulation operation include, without limitation, safety controls for the electrolyzer cell module.

For example, at step 8-5, it is determined whether or not the current drawn by the electrolyzer cell stack is above a current threshold $I_1$. If the current is above the current threshold $I_1$ (yes path, step 8-5), then the electrolyzer cell module is cooled at step 8-10. On the other hand, if the current is below the current threshold 11 (no path, step 8-5), the temperature is checked at step 8-7.

Specifically, at step 8-7 it is determined whether or not the operating temperature of the electrolyzer cell stack is above a first temperature threshold $T_1$ (e.g. 80° C.), which would indicate that the temperature is at a dangerously high level. If the operating temperature is above the first temperature threshold $T_1$ (yes path, step 8-7), then a temperature recovery sequence is initiated at step 8-8, which is an example of an alarm recovery sequence. On the other hand, if the operating temperature is below the first temperature threshold $T_1$ (no path, step 8-7), the temperature is checked again at step 8-9.

Specifically, at step 8-9 it is determined whether or not the operating temperature of the electrolyzer cell stack is above a second temperature threshold $T_2$ (e.g. 70° C.), which is below the first temperature threshold $T_1$. If the operating temperature is above the second temperature threshold $T_2$ (yes path, step 8-9), then the electrolyzer cell module is cooled at step 8-10. On the other hand, if the operating temperature is below the second temperature threshold $T_2$ (no path, step 8-9), the method proceeds to step 8-11.

At step 8-11 it is determined whether or not an operator or another automated machine has requested that the electrolyzer cell module be shutdown. If an operator or another automated machine has requested a shutdown of the electrolyzer cell module (no path, step 8-11), then a normal shutdown procedure is initialized at step 8-13. A normal shutdown procedure includes, without limitation, operations required to controllably cease the operation of the electrolyzer cell module in a non-emergency situation. On the other hand, if an operator or another automated machine has requested the electrolyzer cell module shutdown (yes path, step 8-11), then the control system continues operating to regulate the operation of the electrolyzer cell module.

As noted above, FIGS. 9 and 10 illustrated flow charts for specific examples of alarm recovery sequences in accordance with an embodiment of the invention. Specifically, FIG. 9 shows the steps of an example temperature recovery sequence and FIG. 10 shows the steps of an example resistivity recovery sequence.

Figure 9:
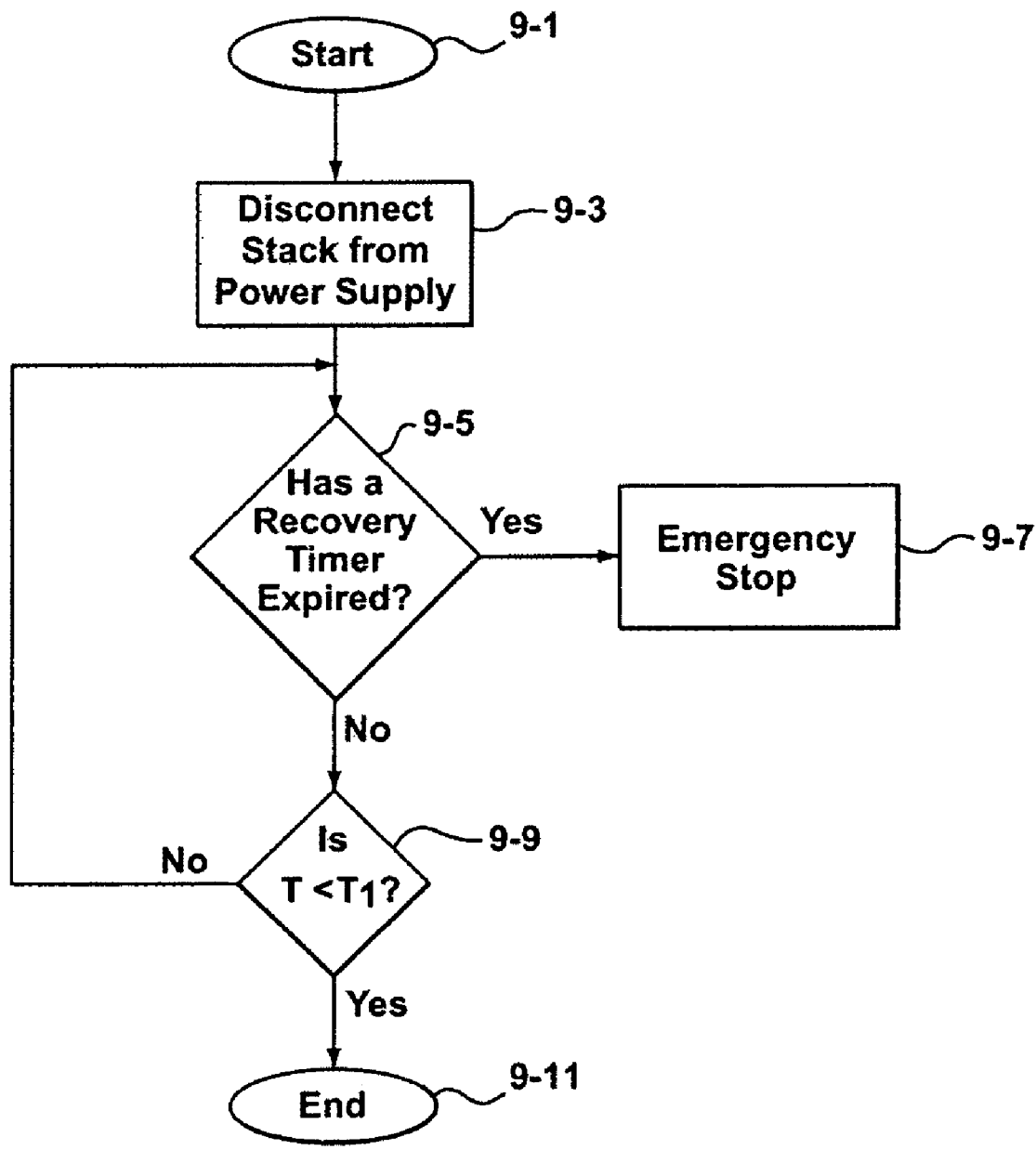
FIG. 9 is a flow chart depicting a very specific example of an alarm recovery sequence in accordance with an embodiment of the invention.

Referring to FIG. 9, in a first step 9-1, the electrolyzer cell stack is disconnected from the power supply. With further reference to FIGS. 2-4, this could be done by switching the state of the stack disconnect device 48. In a second step 9-3, it is determined whether or not a recovery timer has expired. If the timer has expired (yes path, step 9-5), an emergency stoppage is commenced at step 9-7. If the timer has not expired (no path, step 9-5), the temperature is checked at step 9-9.

Specifically, at step 9-9 it is determined whether or not the operating temperature of the electrolyzer cell stack is below the first temperature threshold $T_1$. If the temperature is above (or equal to) the first temperature threshold $T_1$ (no path, step 9-9), then step 9-5 is repeated after a short delay. On the other hand, if the temperature is below the first temperature threshold $T_1$ (yes path, step 9-9), the power supply is reconnected to the electrolyzer cell stack and normal operation recommences at step 9-11.

Figure 10:
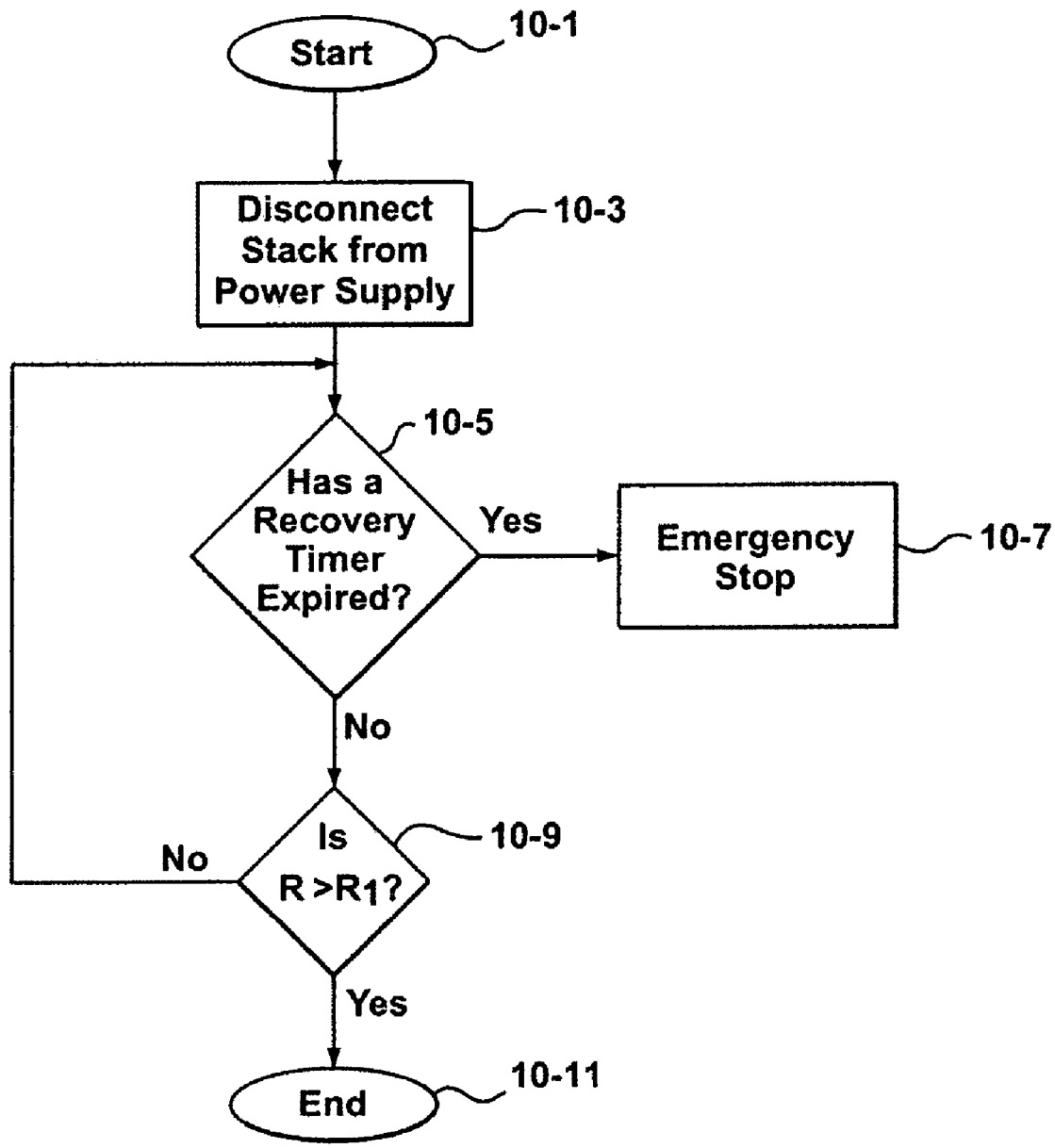
FIG. 10 is a flow chart depicting another very specific example of an alarm recovery sequence in accordance with an embodiment of the invention.

Referring to FIG. 10, in a first step 10-1, the electrolyzer cell stack is disconnected from the power supply. In a second step 10-3, it is determined whether or not a recovery timer has expired. If the timer has expired (yes path, step 10-5), an emergency stoppage is started at step 10-7. If the timer has not expired (no path, step 10-5), the resitivity is checked at step 10-9.

Specifically, at step 10-9 it is determined whether or not the water resistivity is above a first resistance threshold $R_1$. If the water resistivity is below (or equal to) the first resistance threshold $R_1$ (no path, step 10-9), then step 10-5 is repeated after a short delay. On the other hand, if the water resistivity is above the first resistance threshold $R_1$ (yes path, step 10-9), the power supply is reconnected to the electrolyzer cell stack and normal operation recommences at step 10-11.

While the above description provides examples according to aspects of embodiments of the invention, it will be appreciated that the present invention is susceptible to modification and change without departing from the fair meaning and scope of the accompanying claims. Accordingly, what has been described is merely illustrative of the application of some aspects of embodiments of the invention. It is therefore to be understood that within the scope of the appended claims, the invention may be practiced otherwise than as specifically described herein.

We claim:

1. An electrolyzer cell module comprising:
   a safety system for monitoring at least one process and operating parameter related to the operation of the electrolyzer cell module and evaluating whether or not each of a plurality of alarm thresholds has been violated by the at least one process and operating parameter;
   a computer usable medium, in communication with the safety system, having computer program readable code means embodied therein for causing the safety system to suspend the normal operation of the electrolyzer cell module when the at least one of the plurality of alarm thresholds has been violated and subsequently to initiate a corresponding alarm recovery sequence for a the violated alarm threshold, the computer program readable code means comprising:
   instructions for effecting corresponding alarm recovery sequence for each alarm threshold, for evaluating measured process and operating parameters in order to determine whether or not at least one alarm threshold has been violated and, when more than one alarm threshold has been violated, for assigning priorities to the alarm thresholds and initiating the corresponding alarm recovery sequences in order according to their priorities.

2. An electrolyzer cell module according to claim 1, further comprising a number of sensors, and wherein the computer program readable code means further comprises:
   instructions for polling the sensors to measure the at least one process and operating parameter; and
   instructions for evaluating whether or not any one of the alarm thresholds has been violated.

3. An electrolyzer cell module according to claim 1, wherein the computer program readable code means further comprises:
   instructions for suspending the normal operation of the electrolyzer cell module when any one of the alarm thresholds has been violated.

4. An electrolyzer cell module according to claim 2, wherein the computer program readable code means further comprises:
   instructions for generating for each violated alarm threshold, an alarm flag with a respective priority corresponding to the violated alarm threshold.

5. An electrolyzer cell module according to claim 4, wherein the computer program readable code means further comprises:
   instructions for suspending the normal operation of the electrolyzer cell module after at least one alarm flag with a respective priority is generated; and
   instructions for initiating a corresponding alarm recovery sequence for the alarm flag.

6. An electrolyzer cell module according to claim 5, wherein the computer program readable code means further comprises:
   instructions for suspending one of the normal operation of the electrolyzer cell module and an executing alarm recovery sequence if at least one other alarm flag, with a higher priority than the alarm flag corresponding to the executing alarm recovery sequence, is generated; and
   instructions for initiating the corresponding alarm recovery sequence for the at least one other alarm flag.

7. An electrolyzer cell module according to claim 2, wherein the computer program readable code means further comprises:
   instructions for generating an alarm interrupt with a respective priority for each alarm threshold that is violated.

8. An electrolyzer cell module according to claim 7, wherein the computer program readable code means further comprises:
   instructions for suspending the normal operation of the electrolyzer cell module after at least one alarm interrupt with a respective priority is generated; and
   instructions for initiating a corresponding alarm recovery sequence for the alarm interrupt.

9. An electrolyzer cell module according to claim 8, wherein the computer program readable code means further comprises:
   instructions for suspending one of the normal operation of the electrolyzer cell module and an executing alarm recovery sequence if at least one other alarm interrupt, with a higher priority than the alarm interrupt corresponding to the currently executing alarm recovery sequence, is generated; and
   instructions for initiating the corresponding alarm recovery sequence for the at least one other alarm interrupt.

10. An electrolyzer cell module according to claim 1, wherein the computer program readable code means further comprises:
   instructions for determining whether or not an executing alarm recovery sequence was effective; and
   if the alarm recovery sequence is determined to have been not effective, the computer usable medium having computer program readable code means embodied therein for causing the safety system to initiate an emergency shutdown of the electrolyzer cell module; alternatively,
   if the alarm recovery sequence is determined to have been effective, the computer usable medium having computer program readable code means embodied therein for causing the safety system to restart the normal operation of the electrolyzer cell module.

11. An electrolyzer cell module according to claim 1, wherein the computer program readable code means further comprises:
   instructions for allowing an executing alarm recovery sequence to be interrupted and suspended if an alarm threshold having a higher priority is violated; and
   instructions for initiating another alarm recovery sequence corresponding to the violated alarm threshold with the higher priority.

12. An electrolyzer cell module according to claim 11, wherein the computer program readable code means further comprises:
   instructions for determining whether or not an executing alarm recovery sequence was effective; and
   if the alarm recovery sequence is determined to have been not effective, the computer usable medium having computer program program readable code means embodied therein for causing the safety system to initiate an emergency shutdown of the electrolyzer cell module; alternatively,
   if the alarm recovery sequence is determined to have been effective, the computer usable medium having computer program readable code means embodied therein for causing the safety system to restart one of the normal operation of the electrolyzer cell module and the suspended alarm recovery sequence.

13. An electrolyzer cell module according to claim 1, wherein the computer program readable code means further comprises:
   instructions for carrying out sequence steps that make up a particular alarm recovery sequence.

14. An electrolyzer cell module according to claim 1 further comprising a number of regulating devices, the computer program readable code means further comprising:
   instructions for transferring control of the regulating devices to the alarm recovery sequence.

15. A method of controlling an electrolyzer cell module comprising:
   measuring at least one process and operating parameter of the electrolyzer cell module;
   evaluating the at least one process and operating parameter to determine whether or not the at least one alarm threshold has been violated by the at least one process and operating parameter;
   suspending the normal operation of the electrolyzer cell module if at least one alarm threshold has been violated;
   initiating an alarm recovery sequence;
   processing violated alarm thresholds in order of priority;
   suspending an executing alarm recovery sequence if another alarm threshold having a higher priority is violated: and
   initiating another alarm recovery sequence corresponding to the other violated alarm threshold.

16. A method of controlling an electrolyzer cell module according to claim 15 further comprising:
   determining whether or not each alarm recovery sequence was effective; and
   if any one alarm recovery sequence was not effective, terminating the normal operation of the electrolyzer cell module; alternatively,
   if the alarm recovery sequence was effective, effecting one of restarting the normal operation of the electrolyzer cell module and initiating another alarm recovery sequence with lower priority.

17. A method of controlling an electrolyzer cell module according to claim 15 further comprising:
   generating an alarm flag with a respective priority for each violated alarm threshold.

18. A method of controlling an electrolyzer cell module according to claim 15 further comprising:
   generating an alarm interrupt with a respective priority for each violated alarm threshold.

* * * * *

UNITED STATES PATENT AND TRADEMARK OFFICE
CERTIFICATE OF CORRECTION

PATENT NO. : 7,117,106 B2  Page 1 of 4
APPLICATION NO. : 10/944879
DATED : October 3, 2006
INVENTOR(S) : Rusta-Sallehy et al.

It is certified that error appears in the above-identified patent and that said Letters Patent is hereby corrected as shown below:

On Title page item 56 please add

U.S. PATENT DOCUMENTS

| | | |
|---|---|---|
| US2002/0020623 | 02-21-2002 | Speranza et al. |
| US2004/0146755 | 06-29-2004 | Meredith et al. |
| US-3,938,099 | 02-10-1976 | Hyder |
| US-4,176,974 | 12-04-1979 | Bishal et al. |
| US-4,680,710 | 07-14-1987 | Kizilbash |
| US-4,695,977 | 09-22-1987 | Hansen et al. |
| US-4,696,492 | 09-29-1987 | Hardin |
| US-4,710,877 | 12-01-1987 | Ahmed |
| US-4,747,127 | 05-24-1988 | Hansen et al. |
| US-4,857,158 | 05-15-1989 | Cawlfield |
| US-5,159,687 | 10-27-1992 | Richburg |
| US-5,202,977 | 04-13-1993 | Pasetes, Jr. et al. |
| US-5,228,123 | 07-13-1993 | Heckel |
| US-5,313,527 | 05-17-1994 | Guberman et al. |
| US-5,377,280 | 12-27-1994 | Nakayama |
| US-5,388,993 | 02-14-1995 | McKiel et al. |
| US-5,404,528 | 04-04-1995 | Mahajan |
| US-5,410,681 | 04-25-1995 | Jessen et al. |
| US-5,425,110 | 06-13-1995 | Spitz |
| US-5,428,525 | 06-27-1995 | Cappelaere et al. |
| US-5,450,470 | 09-12-1995 | Alheim |
| US-5,467,407 | 11-14-1995 | Guberman et al. |
| US-5,479,487 | 12-26-1995 | Hammond |
| US-5,496,740 | 03-05-1996 | Williams |
| U3-5,512,831 | 04-30-1996 | Cisar et al. |
| US-5,555,346 | 09-10-1996 | Gross et al. |
| US-5,572,668 | 11-05-1996 | See et al. |
| US-5,594,791 | 01-14-1997 | Szlem et al. |
| US-5,600,579 | 02-04-1997 | Steinmetz, Jr. |
| US-5,600,789 | 02-04-1997 | Parker et al. |
| US-5,604,896 | 02-18-1997 | Duxbury et al. |
| US-5,623,657 | 04-22-1997 | Conner et al. |
| US-5,634,086 | 05-27-1997 | Rtischev et al. |
| US-5,664,087 | 09-02-1997 | Tani et al. |
| US-5,666,543 | 09-09-1997 | Gartland |
| US-5,669,000 | 09-16-1997 | Jessen et al. |
| US-5,683,829 | 11-04-1997 | Sarangapani |

UNITED STATES PATENT AND TRADEMARK OFFICE
CERTIFICATE OF CORRECTION

PATENT NO. : 7,117,106 B2
APPLICATION NO. : 10/944879
DATED : October 3, 2006
INVENTOR(S) : Rusta-Sallehy et al.

It is certified that error appears in the above-identified patent and that said Letters Patent is hereby corrected as shown below:

On Title page item 56 please add (cont'd)

| | | |
|---|---|---|
| US-5,692,198 | 11-25-1997 | Ushiku |
| US-5,721,770 | 02-24-1998 | Kohler |
| US-5,734,837 | 03-31-1998 | Flores et al. |
| US-5,739,869 | 04-14-1998 | Markle et al. |
| US-5,745,738 | 04-28-1998 | Ricard |
| US-5,754,755 | 05-19-1998 | Smith, Jr. |
| US-5,763,113 | 06-09-1998 | Meitser et al. |
| US-5,781,720 | 07-14-1998 | Parker et al. |
| US-5,810,284 | 09-22-1998 | Hibbs et al. |
| US-5,822,543 | 10-13-1998 | Dunn et al. |
| US-5,826,088 | 10-20-1998 | Sitbon et al. |
| US-5,848,273 | 12-08-1998 | Fontana et al. |
| US-5,848,352 | 12-08-1998 | Dougherty et al. |
| US-5,652,825 | 12-22-1998 | Winslow |
| US-5,854,927 | 12-29-1998 | Gelissen |
| US-5,854,930 | 12-29-1998 | McLain, Jr. et al. |
| US-5,884,309 | 03-16-1999 | Vanechanos, Jr. |
| US-5,889,950 | 03-30-1999 | Kuzma |
| US-5,896,494 | 04-20-1999 | Perugini et al. |
| US-5,916,705 | 06-29-1999 | Carter et al. |
| US-5,929,319 | 06-25-1990 | Chase et al. |
| US-5,933,525 | 08-03-1999 | Makhoul et al. |
| US-5,944,784 | 08-31-1999 | Simonoff et al. |
| US-5,954,829 | 09-21-1999 | McLain, Jr. et al. |
| US-5,956,709 | 09-21-1999 | Xue |
| US-5,963,635 | 10-05-1999 | Szlam et al. |
| US-6,983,934 | 10-05-1999 | Cochrane et al. |
| US-5,969,715 | 10-19-1999 | Dougherty et al. |
| US-5,969,835 | 10-19-1999 | Kamieniecki et al. |
| US-5,978,594 | 11-02-1999 | Bonnell et al. |
| US-5,978,834 | 11-02-1999 | Simonoff et al. |
| US-5,980,090 | 11-09-1999 | Royal, Jr. et al. |
| US-5,987,251 | 11-16-1999 | Crockett et al. |
| US-6,991,897 | 11-23-1999 | Perugini et al. |
| US-6,002,868 | 12-14-0999 | Jenkins et al. |
| US-6,005,568 | 12-21-1999 | Simonoff et al. |
| US-6,006,035 | 12-21-1999 | Nabahi |
| US-6,014,517 | 01-11-2000 | Shangam et al. |
| US-6,030,718 | 02-29-2000 | Fuglevand et al. |

UNITED STATES PATENT AND TRADEMARK OFFICE
CERTIFICATE OF CORRECTION

PATENT NO. : 7,117,106 B2
APPLICATION NO. : 10/944879
DATED : October 3, 2006
INVENTOR(S) : Rusta-Sallehy et al.

It is certified that error appears in the above-identified patent and that said Letters Patent is hereby corrected as shown below:

On Title page item 56 please add (cont'd)

| | | |
|---|---|---|
| US-6,035,119 | 03-07-2000 | Massena et al. |
| US-6,035,264 | 03-07-2000 | Donaldson et al. |
| US-6,061,727 | 05-09-2000 | Simonoff et al. |
| US-6,072,503 | 06-06-2000 | Tani et al. |
| US-6,072,944 | 06-06-2000 | Robinson |
| US-6,075,528 | 06-13-2000 | Curtis |
| US-6,078,321 | 06-20-2000 | Simonoff et al. |
| US-6,078,322 | 06-20-2000 | Simonoff et al. |
| US-6,078,743 | 06-20-2000 | Apte et al. |
| US-6,094,673 | 07-25-2000 | Dilip et al. |
| US-6,096,449 | 08-01-2000 | Fuglevand et al. |
| US-6,125,387 | 09-26-2000 | Simonoff et al. |
| US-4,129,895 | 10-10-2000 | Edmondson |
| US-6,151,610 | 11-21-2000 | Senn et al. |
| US-6,151,703 | 11-21-2000 | Crelier |
| US-6,163,796 | 12-19-2000 | Yokomizo |
| US-6,167,448 | 12-26-2000 | Hemphill et al. |
| US-6,167,534 | 12-26-2000 | Straathof et al. |
| US-6,173,437 | 01-09-2001 | Polcyn |
| US-6,182,093 | 01-30-2001 | Hagenaais |
| US-6,188,401 | 02-13-2001 | Peyer |
| US-6,202,201 | 03-13-2001 | Domi |
| US-6,218,035 | 04-17-2001 | Fuglevand et al. |
| US-6,222,538 | 04-24-2001 | Anderson |
| US-6,223,190 | 04-24-2001 | Aihara et al. |
| US-6,224,746 | 05-01-2001 | Meissner et al. |
| US-6,256,772 | 07-03-2001 | Apte et al. |
| US-6,263,344 | 07-17-2001 | Wu et al. |
| US-6,263,352 | 07-17-2001 | Cohen |
| US-6,266,681 | 07-24-2001 | Guthrie |
| US-6,266,811 | 07-24-2001 | Nabahi |
| US-6,269,337 | 07-31-2001 | Desmond et al. |
| US-6,273,725 | 08-14-2001 | Berstein et al. |
| US-6,275,868 | 08-14-2001 | Fraley et al. |
| US-6,282,699 | 08-28-2001 | Zhang et al. |
| US-6,285,380 | 09-04-2001 | Perlin et al. |
| US-6,286,033 | 09-04-2001 | Kishinsky et al. |
| US-6,295,531 | 09-25-2001 | Bae et al. |
| US-6,301,703 | 10-09-2004 | Shank et al. |

UNITED STATES PATENT AND TRADEMARK OFFICE
CERTIFICATE OF CORRECTION

PATENT NO. : 7,117,106 B2  
APPLICATION NO. : 10/944879  
DATED : October 3, 2006  
INVENTOR(S) : Rusta-Sallehy et al.

It is certified that error appears in the above-identified patent and that said Letters Patent is hereby corrected as shown below:

On Title page item 56 please add (cont'd)

| | | |
|---|---|---|
| US-6,311,320 | 10-30-2001 | Jibbe |
| US-6,324,042 | 11-27-2001 | Andrews |
| US-6,332,217 | 12-18-2001 | Hastings |
| US-6,336,072 | 01-01-2002 | Takayama et al. |
| US-6,343,362 | 01-29-2002 | Ptacek et al. |
| US-6,348,279 | 02-19-2002 | Saito et al. |
| US-6,353,923 | 03-05-2002 | Bogle et al. |
| US-6,356,867 | 03-12-2002 | Gabai et al. |
| US-6,383,870 | 05-07-2002 | Edlund et al. |
| US-6,387,558 | 05-14-2002 | Fuglevand et al. |
| US-6,428,918 | 08-06-2002 | Fuglevand et al. |
| US-6,451,464 | 09-17-2002 | Edlund et al. |
| US-6,461,751 | 10-08-2002 | Boehm et al. |
| US-6,619,054 | 09-16-2003 | Cargnelli et al. |
| US-6,673,480 | 01-06-2004 | Wilkinson et al. |

FOREIGN PATENT DOCUMENTS

| | | |
|---|---|---|
| WO 01/43216 | 06-14-2001 | Ballard Power Systems Inc. |
| WO 03/107466 | 12-24-2003 | Yuasa Corporation |

Signed and Sealed this

Sixteenth Day of October, 2007

JON W. DUDAS  
*Director of the United States Patent and Trademark Office*